(12) United States Patent
Ryou et al.

(10) Patent No.: US 10,700,400 B2
(45) Date of Patent: Jun. 30, 2020

(54) AIR-ZINC BATTERY MODULE

(71) Applicant: E.M.W.ENERGY CO., LTD., Seoul (KR)

(72) Inventors: Byoung Hoon Ryou, Seoul (KR); Jae Kyung Kong, Seoul (KR)

(73) Assignee: E.M.W.ENERGY CO., LTD., Seoul (KR)

( * ) Notice: Subject to any disclaimer, the term of this patent is extended or adjusted under 35 U.S.C. 154(b) by 113 days.

(21) Appl. No.: 15/768,298

(22) PCT Filed: Oct. 11, 2016

(86) PCT No.: PCT/KR2016/011377
§ 371 (c)(1),
(2) Date: Apr. 13, 2018

(87) PCT Pub. No.: WO2017/065480
PCT Pub. Date: Apr. 20, 2017

(65) Prior Publication Data
US 2018/0309178 A1 Oct. 25, 2018

(30) Foreign Application Priority Data
Oct. 14, 2015 (KR) ........................ 10-2015-0143710

(51) Int. Cl.
*H01M 12/06* (2006.01)
*H01M 2/10* (2006.01)
*H01M 2/30* (2006.01)
*H01M 12/02* (2006.01)
*H01M 2/02* (2006.01)
(Continued)

(52) U.S. Cl.
CPC ......... *H01M 12/06* (2013.01); *H01M 2/1016* (2013.01); *H01M 2/30* (2013.01); *H01M 12/02* (2013.01); *Y02E 60/128* (2013.01)

(58) Field of Classification Search
None
See application file for complete search history.

(56) References Cited

U.S. PATENT DOCUMENTS 5,721,064 A * 2/1998 Pedicini ............ H01M 8/04097
429/407
6,342,314 B1 * 1/2002 Sieminski ............... H01M 2/02
429/407
(Continued)

FOREIGN PATENT DOCUMENTS

JP 3051455 B2 6/2000
JP 2002-231322 A 8/2002
(Continued)

OTHER PUBLICATIONS

International Search Report for PCT/KR2016/011377.

*Primary Examiner* — Ula C Ruddock
*Assistant Examiner* — Amanda Rosenbaum
(74) *Attorney, Agent, or Firm* — The PL Law Group, PLLC

(57) ABSTRACT

An air-zinc battery module includes a case having an air passage for introducing outside air and a housing space formed therein, a battery unit group which is installed in the housing space of the case and is formed by connecting a plurality of battery units to each other, wherein the battery unit is formed by stacking a plurality of air-zinc battery cells which are connected to each other, and a fan which is installed in the housing space of the case to guide air flow.

13 Claims, 4 Drawing Sheets

(51) Int. Cl.
*H01M 2/20* (2006.01)
*H01M 6/46* (2006.01)
*H01M 6/50* (2006.01)
*H01M 8/04089* (2016.01)

(56) References Cited

U.S. PATENT DOCUMENTS

| | | | |
|---|---|---|---|
| 2005/0214636 A1 | 9/2005 | Li | |
| 2008/0305375 A1* | 12/2008 | Yang | H01M 2/1258 429/406 |
| 2010/0136449 A1* | 6/2010 | Yanase | H01M 8/04089 429/432 |
| 2011/0076540 A1 | 3/2011 | Ronning et al. | |
| 2013/0216921 A1* | 8/2013 | Maloney | H01M 10/44 429/403 |

FOREIGN PATENT DOCUMENTS

| | | |
|---|---|---|
| JP | 2013-187113 A | 9/2013 |
| KR | 10-2012-0024094 A | 3/2012 |
| KR | 10-2012-0030733 A | 3/2012 |
| KR | 10-2012-0063051 A | 6/2012 |
| WO | WO 97/44848 A1 | 11/1997 |

* cited by examiner

AIR-ZINC BATTERY MODULE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2016/011377, filed Oct. 11, 2016, which claims priority to the benefit of Korean Patent Application No. 10-2015-0143710 filed in the Korean Intellectual Property Office on Oct. 14, 2015, the entire contents of which are incorporated herein by reference.

TECHNICAL FIELD

The present invention relates to an air-zinc battery module applicable to electric appliances for various purposes such as household purposes, industrial purposes, and military purposes.

BACKGROUND ART

In the past, a battery has been widely used as a mean for supplying power to electric apparatuses. In the past, primary batteries such as a manganese battery, an alkaline manganese battery, and a zinc-air battery, and secondary batteries such as a nickel-cadmium battery, a nickel-hydrogen battery, and a lithium ion battery have been used as the battery. Among these batteries, the air-zinc battery supplies a relatively high voltage of 1.4 V and has advantages such as high energy density and large discharge capacity. In addition, since the air-zinc battery exhibits almost constant discharge characteristics until a discharge thereof is completed, it is considered that the air-zinc battery can replace a mercury battery, of which use is inhibited due to heavy metals contained in the mercury battery.

In order for the air-zinc battery to be applicable to electric appliances for various purposes such as household purposes, industrial purposes, and military purposes, the air-zinc battery is commonly manufactured in the form of an air-zinc battery module which includes minimum battery units, i.e., a plurality of air-zinc battery cells to meet required voltage and current specifications. Since the air-zinc battery module includes the plurality of air-zinc battery cells, a fan device is essentially required to uniformly supply air to all the air-zinc battery cells in the air-zinc battery module. In addition, electric wiring, a power supply, and a switching structure for supplying power to the fan are also important parts so as to miniaturize a battery module product and maximize a lifespan of the battery module product.

FIG. 1 illustrates an arrangement structure of a fan of an existing air-zinc battery module. According to an air-zinc battery module 10 of FIG. 1, two battery units 12 are connected in series in a case 11, and a fan 13 for guiding an air flow into the air-zinc battery module is located in an air inlet 14 of the case (i.e., is exposed to the outside). However, according to the arrangement structure of the fan 13, when external air is supplied to the battery units 12 in the air-zinc battery module, air is intensively supplied only to the battery unit 12 disposed adjacent to the air inlet 14, and air is not sufficiently supplied to the battery unit 12 located far away from the air inlet 14. As a result, an air supply bias or unbalance phenomenon between the battery units becomes a factor which significantly shortens an overall lifespan of the air-zinc battery module. In order to overcome such a problem, it is possible to consider using a fan having a stronger wind force. However, this have to face a problem in that power consumption is increased.

In addition, since the fan is exposed to the outside, a fan blade is contaminated to cause a reduction in an air flow rate, thereby reducing performance of a battery module and causing noise of the fan.

Furthermore, since the existing air-zinc battery module should include a separate heavy battery device for driving the fan, there is a limit in reducing weight of a battery module product and simplifying a structure thereof. Since the existing air-zinc battery module has a structure in which a separate switching device is required to control driving of the fan, space efficiency in the battery module is lowered. Thus, a product is difficult to miniaturize, the electric wiring is complicated, and manufacturing costs are increased. In addition, when the fan is not accidentally turned off at the time of controlling driving of the fan, a battery may be unnecessarily discharged to inadvertently reduce a lifespan of a battery module.

SUMMARY

The present invention has been made in order to solve the above problems, and is directed to providing an air-zinc battery module capable of reducing power consumption thereof by guiding an air flow to uniformly supply to all battery units therein by using a fan a blowing force having a much lower than that of an existing one.

In addition, the present invention is directed to providing an air-zinc battery module capable of reducing power consumption capable of minimizing contamination of a fan blade of a fan and noise caused by the fan, occurring in an existing air-zinc battery module.

Furthermore, the present invention is directed to providing an air-zinc battery module capable of simplifying a structure of a product and reducing weight thereof compared to existing products, because a separate heavy battery device is required to drive a fan.

In addition, the present invention is directed to providing an air-zinc battery module in which since a separate switching device is not required to drive and stop a fan, a product may be miniaturized to simplify electric wiring and reduce manufacturing costs and driving control of the fan may be easy to manage.

One aspect of the present invention provides an air-zinc battery module including: a case having air holes through which external air is introduced, and an accommodation space formed therein; a battery unit group installed in the accommodation space inside the case and formed by connecting a plurality of battery units which are each formed by connecting and stacking a plurality of air-zinc battery cells; and a fan installed in the accommodation space inside the case to guide an air flow.

battery units may be arranged in a line and connected in series to battery units adjacent thereto to form the battery unit group, and the fan may be formed between all or some of the battery units, wherein the fan is formed such that a direction of a rotation axis of a blade thereof is the same as an arrangement direction of the line of the battery units.

The air-zinc battery module may further include a partition formed to partition the accommodation space inside the case and be perpendicular to a surface of the case, in which the air holes are formed, wherein the battery unit group includes a first battery unit group and a second battery unit group, the first battery unit group and the second battery unit group are disposed in parallel with the partition in-between, and the fan is formed to penetrate a portion of the partition.

The fan may be formed in the partition so as to be located between the battery units located farthest from the surface of the case in which the air holes are formed, among the battery units of the first battery unit group and the second battery unit group.

The fan may be formed such that a direction of a rotation axis of a blade thereof is perpendicular to a surface of the partition.

The air-zinc battery module may further include a female switching connector electrically connected to the battery unit group and the fan; and a male switching connector connected to the female switching connector to supply power of the battery unit group to an inverter electrically connected thereto, wherein the female switching connector and the male switching connector are connected to drive the fan.

The female switching connector may have two positive terminals and one negative terminal, one positive terminal of the positive terminals of the female switching connector may be connected to a positive electrode of the battery unit group, the other positive terminal of the positive terminals of the female switching connector may be connected to a positive terminal of the fan, the negative terminal of the female switching connector may be connected to a negative terminal of the fan, the male switching connector may have two positive terminals and one negative terminal formed so as to be connected to the terminals of the female switching terminal, and the two positive terminals of the male switching connector may be electrically connected to each other.

The negative terminal of the female switching connector may be connected to a negative electrode of the battery unit group through electric wiring, and the electric wiring connecting the negative terminal of the female switching connector and the negative electrode of the battery unit group may be connected to the negative terminal of the fan in a side branch form.

At least one of the positive terminals of the male switching connector may be connected to a positive electrode of the inverter, and the negative electrode of the male switching connector may be connected to a negative electrode of the inverter.

The air-zinc battery module may further include spacers formed on a surface of an air electrode side of each of the air-zinc battery cells such that the air-zinc battery cells form spaces together with air-zinc battery cells adjacent thereto.

Since a fan is located inside a case of an air-zinc battery module according to the present invention, an air flow can be guided to uniformly supply air to all battery units in the battery module, thereby suppressing a decrease in performance of the zinc battery module and maintaining a lifespan thereof. In comparison with an existing air-zinc battery module, when a battery module having the same performance is implemented, it is possible to use a fan having a blowing force much lower than that of the existing air-zinc battery module, thereby considerably reducing consumption power consumed to drive the fan.

Furthermore, it is possible to prevent a reduction in an air flow rate caused by contamination of a fan blade due to exposure of a fan and a decrease in performance of a battery module due to the reduction in the air flow rate, occurring in an existing battery module. In addition, it is possible to minimize noise caused by the fan.

In addition, according to an electric wiring connection structure and a switching structure of the present invention, a separate heavy battery device is not required to drive a fan in a battery module, thereby simplifying a structure of a product and reducing weight thereof compared to existing products. A separate switching device is not required to drive and stop the fan unlike existing battery module products, thereby improving space efficiency inside the battery module to miniaturize a product, simplifying electric wiring, and reducing manufacturing costs. In addition, since driving control of the fan is performed only by connecting and disconnecting a switching connector, it is possible to prevent a lifespan of the battery module from being reduced due to unnecessary discharging of the battery module occurring when the fan is not accidentally turned off as in existing products, thereby easily managing a product.

DETAILED DESCRIPTION

Figure 1:
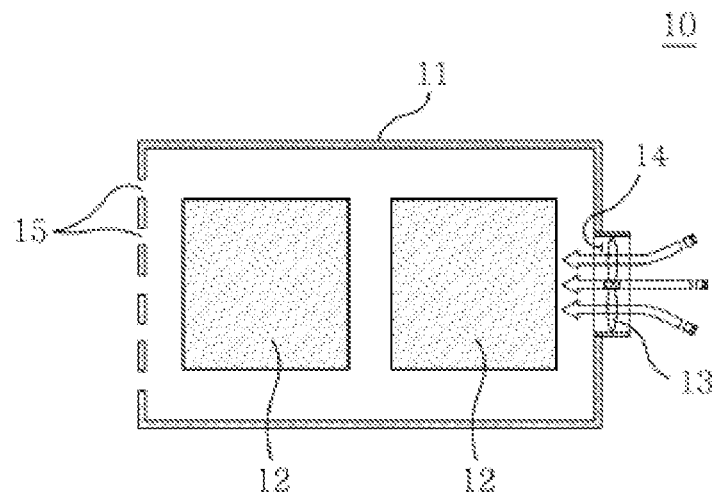
FIG. 1 illustrates an arrangement structure of a fan of an existing air-zinc battery module.

As embodiments allows for various changes and numerous embodiments, exemplary embodiments will be illustrated in the drawings and described in detail in the written description. However, this is not intended to limit embodiments to particular modes of practice, and it is to be appreciated that all changes, equivalents, and substitutes that do not depart from the spirit and technical scope of embodiments are encompassed in embodiments. In the description of embodiments, certain detailed explanations of the related art are omitted when it is deemed that they may unnecessarily obscure the essence of the present invention.

It is to be understood that terms employed herein are for the purpose of description of particular embodiments and not of limitation. The singular forms "a" and "an" include plural referents unless otherwise stated. Further, it should be understood that terms "include" or "have" are inclusive of characteristics, numerals, steps, operations, elements, parts or combination thereof, which are described herein, bur are not exclusive of one or more different characteristics, numerals, steps, operations, elements, parts or combination thereof.

Although the terms "first", "second", etc. are used herein to describe various elements, these elements should not be limited by these terms. These terms are only used to distinguish one element from another element.

Hereinafter, the present invention will be described in detail, and if necessary, the present invention will be described in detail with reference to the drawings. The following drawings are a mere example which is provided for more understanding of the present invention but does not limit the scope of the present invention.

The present invention relates to an air-zinc battery module. More particularly, the present invention relates to an air-zinc battery module including a plurality of battery units which are each formed by connecting and stacking a plurality of air-zinc battery cells in series in a case. The battery units are connected in series to battery units adjacent thereto to form at least one battery unit group. A fan having a positive terminal and a negative terminal and guiding an air flow is provided in one area inside the case, which is not exposed to the outside. A female switching connector having two positive terminals and one negative terminal is formed in one region of one surface of the case. One positive terminal of the positive terminals of the female switching connector is connected to a positive electrode at a positive side end of the battery unit group through electric wiring, and the other positive terminal of the positive terminals of the female switching connector is connected to the positive terminal of the fan through electric wiring. The negative terminal of the female switching connector is connected to a negative electrode at a negative side end of the battery unit group through electric wiring. The electric wiring connected to the negative terminal of the female switching connector is connected to the negative terminal of the fan in a side branch form.

In the present invention, the air-zinc battery cell is a minimum unit constituting the air-zinc battery module according to the present invention. Generally known in the art, the air-zinc battery cell has an internal structure in which an air positive electrode portion including an air diffusion layer, a catalyst active layer, and the like, a negative electrode portion including an zinc gel with a mixture of zinc and an electrolyte, and the like, and a separator disposed to prevent a short circuit between the air positive electrode portion and the negative electrode portion.

In the present invention, the air-zinc display cell may have any shape. However, in order to form the battery units in a stacked structure in consideration of space efficiency, it is structurally desirable to use a plate-shaped air-zinc battery cell.

Figure 6:
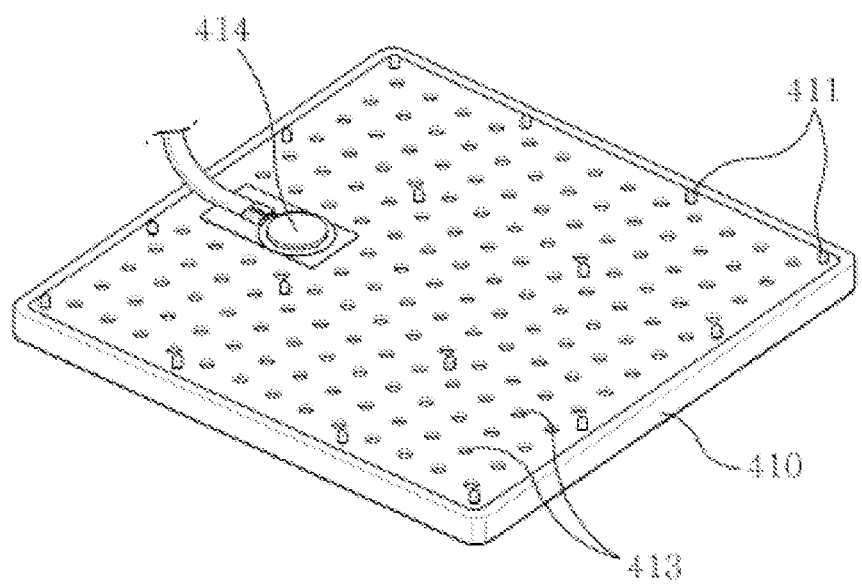
FIG. 6 illustrates an air-zinc battery cell according to an exemplary embodiment of the present invention.

For better understanding of the air-zinc battery cell, a description will be made through an example shown in FIG. 6, as shown in FIG. 6, an air-zinc battery cell 410 has a plate shape, and a plurality of air holes 413 are formed in a surface of an air positive electrode side of the air-zinc battery cell 410 such that air flows into the air-zinc battery cell 410 from the outside.

Figure 5:
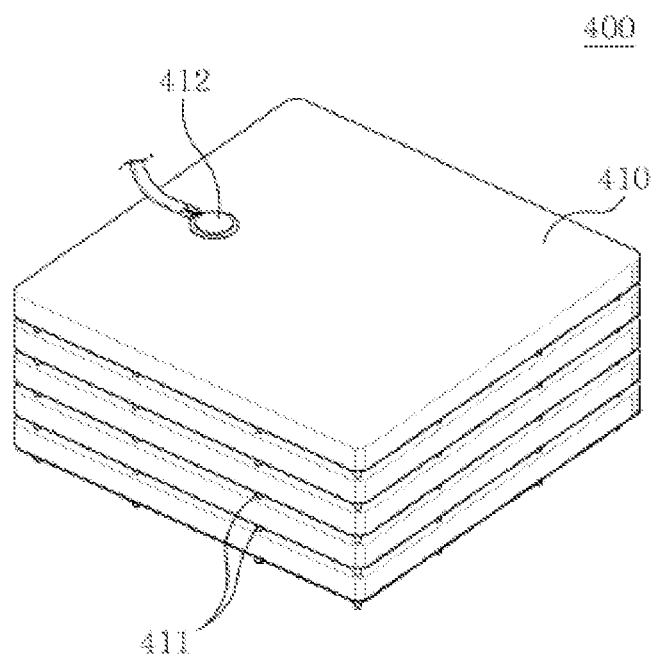
FIG. 5 is a perspective view illustrating a battery unit according to an exemplary embodiment of the present invention.

In addition, due to spacers 411 having a protrusion shape, formed in the surface of the air positive electrode side of the air-zinc battery cell 410, when a battery unit 400 is formed by stacking the air-zinc battery cells 410 as shown in FIG. 5, a space, through which air smoothly flows, may be formed between the stacked air-zinc battery cells 410. Accordingly, air can be smoothly supplied to each of the air-zinc battery cells 410 constituting the battery unit 400, and an air flow can also be smoothly performed in the case of the air-zinc battery module according to the present invention.

In the present invention, the battery unit has a structure in which a plurality of air-zinc battery cells are electrically connected in series and are each stacked. In the present invention, since the plurality of air-zinc battery cells are electrically connected in series to form one battery unit, in order for the air-zinc battery module to be applicable to electric appliances for various purposes such as household purposes, industrial purposes, and military purposes, the battery unit has an advantage in increasing a voltage thereof. Describing an example with reference to FIG. 5, FIG. 5 is a perspective view illustrating the battery unit according to an exemplary embodiment of the present invention. As shown in FIG. 5, the battery unit 400 according to the present invention has a structure in which five air-zinc battery cells 410 are connected in series and are stacked. When each of the five air-zinc battery cells 410 has a voltage of 1.3 V to 1.4 V, the battery unit 400 may have a voltage of 6 V or more.

In the present invention, the number of the air-zinc battery cells constituting a single battery unit is not particularly limited. The number of the air-zinc battery cells per single battery unit may be arbitrarily determined according to purposes in which the air-zinc battery module according to the present invention is used.

In the present invention, the battery unit group is an assembly formed by stacking air-zinc battery cells in series to form each of the battery units and connecting the battery units in series. As a result, since voltages of the battery units are added up, the battery unit group according to the present invention can have a voltage which is as high as the number of the battery units included therein. The air-zinc battery module according to the present invention may include at least one battery unit group. When the air-zinc battery module includes two or more battery unit groups, the battery unit groups can be electrically connected in parallel to each other, thereby increasing a current value in accordance with a specification of an electric appliance to which the air-zinc battery module is applied.

In the present invention, the fan functions to guide an external air flow into the air-zinc battery module and uniformly supply air to the battery units which each include the plurality of air-zinc battery cells in the air-zinc battery module. In the present invention, since the fan is located inside the case of the air-zinc battery module unlike an existing air-zinc battery module shown in FIG. 1, it is possible to prevent a reduction in an air flow rate caused by contamination of a fan blade due to exposure of the fan and a decrease in performance of a battery module due to the reduction in the air flow rate, occurring in the existing air-zinc battery module. In addition, it is possible to minimize noise caused by the fan, occurring in the existing battery module.

Furthermore, according to the present invention, in order to guide an air flow and supply air to all the battery units in the air-zinc battery module as uniform as possible according to the number and arrangement configuration of the battery units and the battery unit groups included in the air-zinc battery module, it is important to appropriately set an arrangement position, an arrangement direction, and the like of the fan in the battery module according to the number and arrangement configuration of the battery units and the battery unit groups.

When the battery units are arranged in a line and connected in series to battery units adjacent thereto to form one battery unit group in the battery module, in order to guide an air flow and supply air to all the battery units in the battery module as uniform as possible, it is desirable that the fan is provided between all or some of the battery units and a direction of the fan is the same as a direction of a rotation axis of a blade and an arrangement direction of the line of the battery units. For better understanding, a description will be made with reference to an example shown in FIG. 2.

Figure 2:
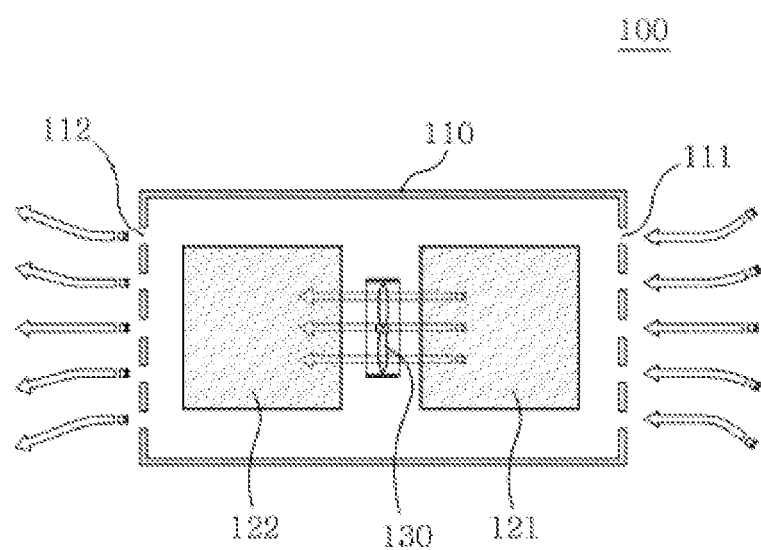
FIG. 2 illustrates an arrangement structure of a fan of an air-zinc battery module according to an exemplary embodiment of the present invention.

As shown in FIG. 2, in an air-zinc battery module 100 according to an exemplary embodiment of the present invention, two battery units 121 and 122 are arranged in a line and connected in series in a case 110 to form one battery unit group, a fan 130 is located between the battery units 121 and 122 to guide an air flow in the module, and a direction of the fan 130 is set to be the same as a direction of a rotation axis of a blade and an arrangement direction of the line of the battery units 121 and 122. Since the position and direction of the fan 130 is set as described above, air can be uniformly supplied even to the battery unit 122 located in an air discharge portion in the battery module when external air is guided into the battery module. As in the existing air-zinc battery module shown in FIG. 1, when one fan 130 is located only in an entrance side of the module through which external air is introduced, air cannot be uniformly supplied to the battery unit 122 located in the air discharge portion in the battery module. Thus, this causes an air supply unbalance between the battery units, resulting in a decrease in overall performance of the battery module.

In another example, air holes are formed in one side surface of the case of the air-zinc battery module such that air flows into the air-zinc battery module from the outside, and battery units in the battery module form two battery unit groups including a first battery unit group and a second battery unit group, wherein the first battery unit group and the second battery unit group are configured to be arranged in parallel with a partition in-between and be connected in parallel to each other through electric wiring. When the partition is formed perpendicular to the surface of the case, in which the air holes are formed, the fan may be formed to penetrate a portion of the partition and may be located between the battery units located farthest from the surface of the case in which the air holes are formed, among the battery units of the first battery unit group and the second battery unit group. In addition, a direction of the fan may be set such that a direction of a rotation axis of a blade is perpendicular to the surface of the partition, thereby uniformly supply air to all the battery units in the battery module. For better understanding, a description will be made with reference to an example shown in FIG. 3.

Figure 3:
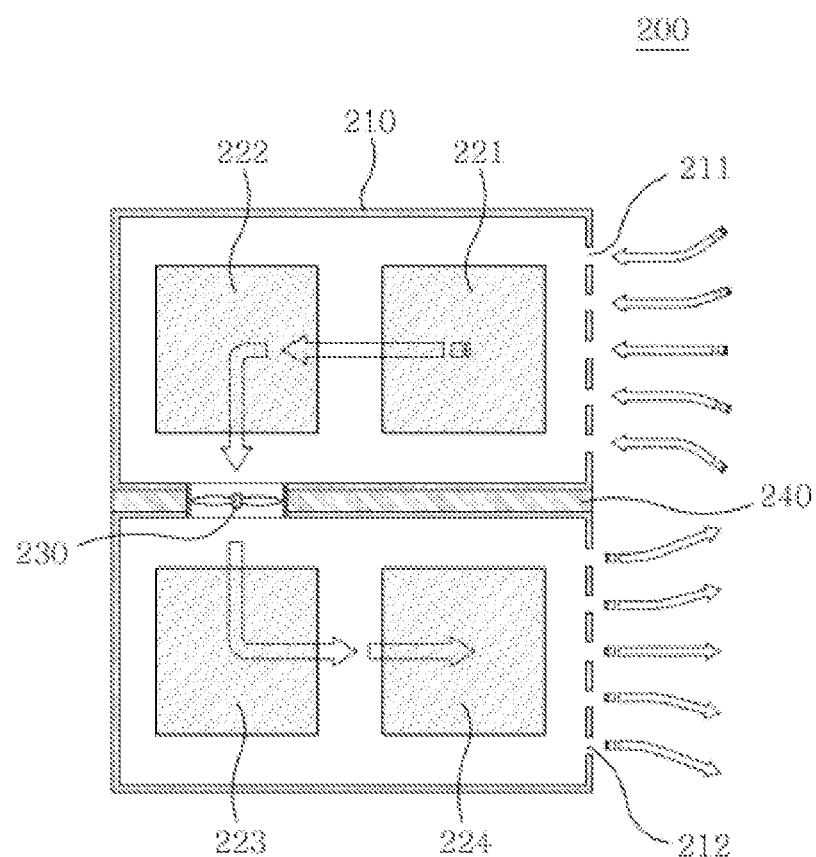
FIG. 3 illustrates an arrangement structure of a fan of an air-zinc battery module according to another exemplary embodiment of the present invention.

In an air-zinc battery module 200 according to an exemplary embodiment of the present invention shown in FIG. 3, air holes 211 and 212 are formed in one side surface of a case 210 such that external air flows into the battery module, and four battery units 221, 222, 223, and 224 are provided in the air-zinc battery module 200. The two battery units 221 and 222 at one side are connected in series to each other and arranged in a line to form a first battery unit group and the two battery units 223 and 224 at the other side are connected in series to each other and arranged in a line to form a second battery unit group, with respect to a partition 240 formed at a center of the battery module so as to be perpendicular to the surface of the case 210, in which the air holes 211 and 212 are formed. As shown in FIG. 3, a fan 230 is formed to penetrate a portion of the partition 240 and is located between the battery units 222 and 223 located farthest from the surface of the case 210 in which the air holes 211 and 212 are formed, among the battery units of the first battery unit group and the second battery unit group. A direction of the fan 230 is set such that a direction of a rotation axis of a blade is perpendicular to the surface of the partition 240. Accordingly, even when only one fan is provided in the air-zinc battery module, according to a structure shown in FIG. 3, air introduced from the outside can be guided to sequentially flow from the first battery unit 221 to the final battery unit 224 in a U shape and can be discharged to the outside of the battery module, so that air can be uniformly supplied to all the battery units 221, 222, 222, and 224 in the battery module.

That is, according to an arrangement structure of the fan according to the present invention, when a battery module having the same performance is implemented, it is possible to use a fan having a blowing force much lower than that of an existing one. Accordingly, it is possible to considerably reducing consumption power consumed to drive the fan.

In the present invention, since the fan uses electric energy as a power source, the fan has a positive terminal and a negative terminal such that electric wiring is connected thereto.

The female switching connector provided in the air-zinc battery module of the present invention is formed in one region of one surface of the case in the air-zinc battery module. The female switching connector has two positive terminals and one negative terminal. One positive terminal of the positive terminals of the female switching connector is connected to a positive electrode at a positive side end of the battery unit group through electric wiring, and the other positive terminal of the positive terminals of the female switching connector is connected to the positive terminal formed in the fan through electric wiring.

The negative terminal of the female switching connector is connected to a to negative electrode at a negative side end of the battery unit group through electric wiring. In order to use a portion of electricity generated in the air-zinc battery module as driving energy of the fan, electric wiring connected to the negative terminal of the female switching connector is connected to the negative terminal of the fan in a side branch form. That is, according to the present invention, since a separate heavy battery device is not required to drive the fan in the battery module, a structure of a product can be simplified and weight thereof can be reduced compared to existing products.

In the present invention, the female switching connector may be connected to and disconnected from a male switching connector electrically connected to an inverter. The male switching connector has two positive terminals and one negative terminal formed so as to correspond to the terminals of the female switching connector. The positive terminals of the male switching connector are connected to each other through electric wiring. Due to the structural characteristics, when the male switching connector is connected to the female switching connector, a current flows in the battery units, and concurrently, the fan is electrically connected to the battery units and thus is driven. When the male switching connector is disconnected, it is possible to stop the current flow in the battery units and the driving of the fan. That is, unlike existing battery module products, in the air-zinc battery module according to the present invention, a separate switching device is not required to drive and stop the fan, thereby improving space efficiency inside the battery module to miniaturize a product, simplifying electric wiring, and reducing manufacturing costs. In addition, since driving control of the fan is performed only by connecting and disconnecting the switching connector, it is possible to prevent a lifespan of the battery module from being reduced due to unnecessary discharging of the battery module occurring when the fan is not accidentally turned off as in existing products.

For better understanding, a description will be made through an electric wiring connection structure shown as an example in FIG. 4.

Figure 4:
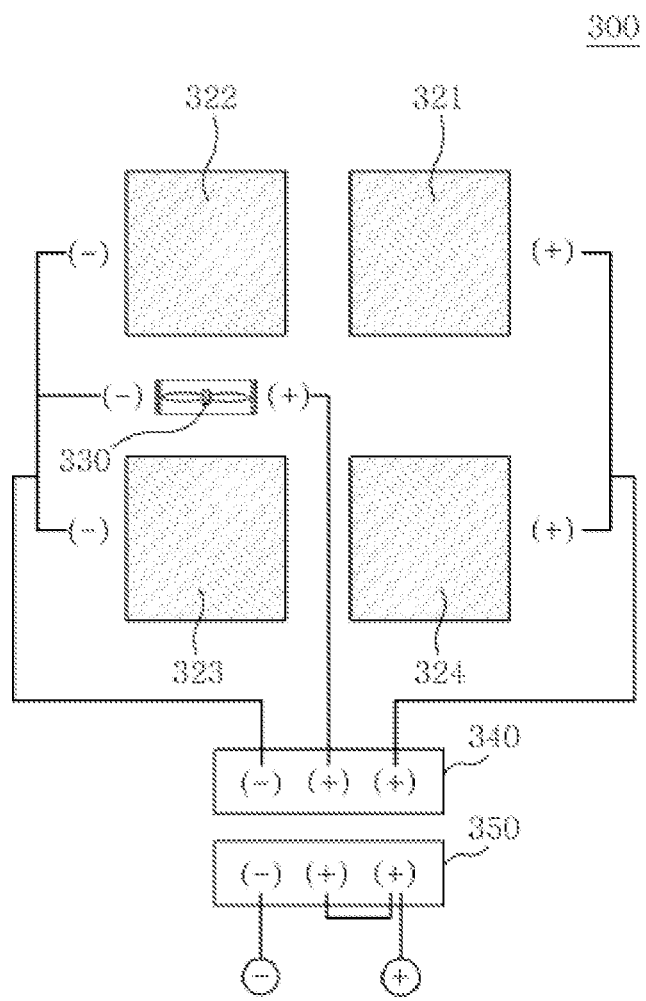
FIG. 4 illustrates an example of an electric wiring connection structure of an air-zinc battery module according to an exemplary embodiment of the present invention.

FIG. 4 illustrates an electric wiring connection structure of the air-zinc battery module (including four battery units) shown as an example in FIG. 3. As shown in FIG. 4, a first battery unit group 321 and 322 and a second battery unit group 323 and 324 are connected in parallel to each other through electric wiring. A positive electrode at a positive side end of each of the battery unit groups is connected to one positive terminal of two positive terminals formed in a female switching connector 340 through electric wiring, and a negative electrode at a negative side end of each of the battery unit groups is connected to one negative terminal formed in the female switching connector 340 through electric wiring. In addition, a positive terminal formed in a fan 330 is connected to the other positive terminal of the two positive terminals formed in the female switching connector 340 through electric wiring. A negative terminal formed in the fan 330 is connected to the negative terminal of the female switching connector 340 in a side branch form branched from electric wiring connected to the negative terminal of the female switching connector 340.

Furthermore, a male switching connector 350 able to be connected to and disconnected from the female switching connector 340 is shown in FIG. 4. The male switching connector 350 has two positive terminals and one negative terminal formed so as to correspond to the female switching connector 340. In particular, the two positive terminals of the male switching connector 350 are connected to each other through electric wiring.

Although the embodiments of the present invention have been disclosed for illustrative purposes, those skilled in the art will appreciate that a variety of different modifications and variations are possible, without departing from the technical to conception and essential features of the invention. Also, the scope of the present invention is defined by the following claims rather than by the detailed description of the illustrative embodiments, and all modifications and variations conceived from the meaning and scope of the claims and their equivalents should be understood as falling within the scope of the present invention.

The invention claimed is:

1. An air-zinc battery module comprising:
   a case having air holes through which external air is introduced, and an accommodation space formed therein;
   a battery unit group installed in the accommodation space inside the case and formed by connecting a plurality of battery units which are each formed by connecting and stacking a plurality of air-zinc battery cells; and
   a fan installed in the accommodation space inside the case to guide an air flow,
   wherein the battery units are arranged in a single row or a plurality of rows:
   when the battery units are arranged in a single row, the fan is formed between surfaces of at least two neighboring battery units facing each other; and
   when the battery units are arranged in at least two rows and each row has at least two battery units, the fan is formed between the at least two rows;
   further comprising a partition formed to partition the accommodation space inside the case and to be perpendicular to a surface of the case, in which the air holes are formed,
   wherein the battery unit group comprises a first battery unit group comprised of a plurality of first battery units in a first row and a second battery unit group comprised of a plurality of second battery units in a second row:
   the first battery unit group and the second battery unit group are disposed in parallel with the partition in-between; and
   the fan is formed in the partition.

2. The air-zinc battery module of claim 1, wherein the battery units are arranged in the single row and connected in series to battery units adjacent thereto to form the battery unit group; and
   the fan is formed between all or some of the battery units, wherein the fan is formed such that a rotation axis of a blade thereof is between surfaces of at least two neighboring battery units facing each other.

3. The air-zinc battery module of claim 1, wherein the fan is formed in the partition so as to be located between the first and second battery units located farthest from the surface of the case in which the air holes are formed, among the first and second battery units of the first battery unit group and the second battery unit group.

4. The air-zinc battery module of claim 1, wherein the fan is formed such that a direction of a rotation axis of a blade thereof is perpendicular to a surface of the partition.

5. The air-zinc battery module of claim 1, further comprising a female switching connector electrically connected to the battery unit group and the fan; and
   a male switching connector connected to the female switching connector to supply power of the battery unit group to an inverter electrically connected thereto,
   wherein the female switching connector and the male switching connector are connected to drive the fan.

6. The air-zinc battery module of claim 5, wherein the female switching connector has two positive terminals and one negative terminal,
   one positive terminal of the positive terminals of the female switching connector is connected to a positive electrode of the battery unit group,
   the other positive terminal of the positive terminals of the female switching connector is connected to a positive terminal of the fan,
   the negative terminal of the female switching connector is connected to a negative terminal of the fan,
   the male switching connector has two positive terminals and one negative terminal formed so as to be connected to the terminals of the female switching terminal, and
   the two positive terminals of the male switching connector are electrically connected to each other.

7. The air-zinc battery module of claim 6, wherein the negative terminal of the female switching connector is connected to a negative electrode of the battery unit group through electric wiring, and
   the electric wiring connecting the negative terminal of the female switching connector and the negative electrode of the battery unit group is connected to the negative terminal of the fan in a side branch form.

8. The air-zinc battery module of claim 6, wherein at least one of the positive terminals of the male switching connector is connected to a positive electrode of the inverter, and the negative electrode of the male switching connector is connected to a negative electrode of the inverter.

9. The air-zinc battery module of claim 1, further comprising spacers formed on a surface of an air electrode side of each of the air-zinc battery cells such that the air-zinc battery cells form spaces together with air-zinc battery cells adjacent thereto.

10. The air-zinc battery module of claim 1, wherein the plurality of battery units comprises a first battery unit and a second battery unit, and the fan is formed between surfaces of the first battery unit and the second battery unit facing each other; and
    the case has a first surface provided with first air holes and a second surface facing the first surface and provided with second air holes.

11. The air-zinc battery module of claim 1, wherein the case has a first surface provided with air holes and the second surface facing the first surface;
    the battery unit groups comprise a first battery unit group comprising first battery units arranged in a first row and a second battery unit group comprising second battery units arranged in a second row parallel to the first row;

a partition perpendicular to the first surface and the second surface and partitioning the case into a first space accommodating the first battery unit group and a second space accommodating the second battery unit group; and the fan formed in the partition between a first battery unit and a second battery unit located closest to the second surface.

12. The air-zinc battery module of claim 1, further comprising a female switching connector electrically connected to the battery unit group and the fan; and a male switching connector connected to the female switching connector to supply power of the battery unit group to an inverter electrically connected thereto, wherein the female switching connector and the male switching connector are connected to drive the fan, wherein the plurality of battery units comprises a first battery unit and a second battery unit, and the fan is formed between surfaces of the first battery unit and the second battery unit facing each other; and the case has a first surface provided with first air holes and a second surface facing the first surface and provided with second air holes.

13. The air-zinc battery module of claim 1, further comprising a female switching connector electrically connected to the battery unit group and the fan; and a male switching connector connected to the female switching connector to supply power of the battery unit group to an inverter electrically connected thereto, wherein the female switching connector and the male switching connector are connected to drive the fan, wherein the case has a first surface provided with air holes and the second surface facing the first surface;

the battery unit groups comprise a first battery unit group comprising first battery units arranged in a first row and a second battery unit group comprising second battery units arranged in a second row parallel to the first row;

a partition perpendicular to the first surface and the second surface and partitioning the case into a first space accommodating the first battery unit group and a second space accommodating the second battery unit group; and the fan formed in the partition between a first battery unit and a second battery unit located closest to the second surface.

* * * * *